United States Patent
Pitchford et al.

(10) Patent No.: US 7,600,998 B1
(45) Date of Patent: Oct. 13, 2009

(54) PORTABLE HEATER WITH ROLL CAGE (76) Inventors: Eric Pitchford, 2701 Industrial Dr., Bowling Green, KY (US) 42101; Henry Haley, 2701 Industrial Dr., Bowling Green, KY (US) 42101; Craig Higginbotham, 2701 Industrial Dr., Bowling Green, KY (US) 42101; Griffin Bland, 2701 Industrial Dr., Bowling Green, KY (US) 42101

( * ) Notice: Subject to any disclaimer, the term of this patent is extended or adjusted under 35 U.S.C. 154(b) by 144 days.

(21) Appl. No.: 11/668,668

(22) Filed: Jan. 30, 2007

Related U.S. Application Data (60) Provisional application No. 60/822,436, filed on Aug. 15, 2006.

(51) Int. Cl.
F24H 1/00 (2006.01)

(52) U.S. Cl. .......................... 432/222; 126/60; 126/61; 126/110 B; 432/219

(58) Field of Classification Search .................. 126/11, 126/349, 60, 61, 110 B; 455/575.8; 432/219, 432/222
See application file for complete search history.

(56) References Cited

U.S. PATENT DOCUMENTS

| | | | |
|---|---|---|---|
| 1,730,982 A | | 10/1929 | Pankratz et al. |
| 2,323,456 A | | 7/1943 | Curley et al. |
| 2,336,716 A | | 12/1943 | Clements |
| D170,330 S | * | 9/1953 | Miller .......................... D15/9 |
| D180,667 S | * | 7/1957 | Mancusi .................... D23/335 |
| 3,174,594 A | * | 3/1965 | Krausz ........................ 52/261 |
| 3,261,597 A | | 7/1966 | McGough |
| D213,694 S | * | 4/1969 | Baron ........................ D23/337 |
| 3,706,446 A | | 12/1972 | Briggs |
| 3,725,640 A | | 4/1973 | Kunz |
| 3,822,690 A | | 7/1974 | Kofink |
| 3,894,526 A | | 7/1975 | Kofink |
| 4,081,238 A | * | 3/1978 | Briggs et al. ................. 432/222 |
| 4,140,100 A | * | 2/1979 | Ishihara .................... 126/92 B |
| 4,201,544 A | * | 5/1980 | Briggs et al. ................. 432/222 |
| D256,273 S | * | 8/1980 | Townsend et al. .......... D23/336 |
| 4,307,701 A | | 12/1981 | Balon et al. |
| 4,313,417 A | * | 2/1982 | Briggs et al. ............ 126/110 B |
| 4,354,479 A | * | 10/1982 | Haruhara ................ 126/92 AC |
| 4,443,187 A | | 4/1984 | Shaftner et al. |
| 4,703,152 A | * | 10/1987 | Shih-Chin ................... 392/366 |
| 4,788,013 A | * | 11/1988 | Kinney et al. ................. 261/24 |
| 4,825,746 A | * | 5/1989 | Herner .......................... 91/45 |
| D319,694 S | * | 9/1991 | Wortham ................... D23/336 |

(Continued)

*Primary Examiner*—Kenneth B Rinehart
*Assistant Examiner*—Jorge Pereiro
(74) *Attorney, Agent, or Firm*—Chad D. Bruggeman; John F. Salazar; Middleton Reutlinger (57) ABSTRACT

An elongated generally cylindrical shell of a portable gas forced air unit is provided with a roll cage for protection. A pair of end caps located at each proximate end of the shell are connected by a plurality of roll cage bars extending parallel with the combustion chamber, whereby, the combination of end caps and roll cage bars serve to protect the concentric shell and its internal combustion chamber from damage. The end caps include a plurality of end bumps dimensioned and located to protect the outer extent of the portable unit while being oriented in substantially vertical or horizontal positions, and serve to support the portable unit when in a vertical position on a surface. The portable gas forced air unit is also adapted to be releasably interconnected with similar units.

22 Claims, 6 Drawing Sheets

U.S. PATENT DOCUMENTS

| | | | | |
|---|---|---|---|---|
| D347,683 S * | 6/1994 | Chiu et al. | | D23/336 |
| 5,505,042 A * | 4/1996 | Keip | | 53/588 |
| 5,522,207 A * | 6/1996 | Keip | | 53/556 |
| 5,540,213 A | 7/1996 | Shell et al. | | |
| 5,766,003 A | 6/1998 | Vogelzang | | |
| 5,848,585 A | 12/1998 | Long et al. | | |
| 6,142,141 A * | 11/2000 | Long | | 126/110 B |
| 6,357,251 B1 * | 3/2002 | Marks | | 62/425 |
| 6,450,436 B1 * | 9/2002 | Tsuji et al. | | 242/400.1 |
| 6,470,876 B1 * | 10/2002 | Schmidt et al. | | 126/89 |
| 6,857,870 B2 * | 2/2005 | Topp | | 431/350 |
| 6,884,065 B2 * | 4/2005 | Vandrak et al. | | 432/222 |
| 6,892,789 B2 * | 5/2005 | Boyle | | 164/35 |
| 6,942,464 B2 | 9/2005 | Brashears et al. | | |
| 6,973,260 B2 * | 12/2005 | Orr et al. | | 392/365 |
| 6,991,437 B2 | 1/2006 | Cherry et al. | | |
| 7,029,240 B2 | 4/2006 | Baron et al. | | |
| 2002/0096411 A1 * | 7/2002 | Tsuji et al. | | 191/12 R |
| 2004/0108090 A1 * | 6/2004 | Boyle | | 164/35 |
| 2005/0031944 A1 * | 2/2005 | Sodemann et al. | | 429/150 |
| 2005/0074296 A1 * | 4/2005 | McCarty et al. | | 405/224.4 |
| 2005/0089409 A1 | 4/2005 | Boohar et al. | | |
| 2005/0123359 A1 * | 6/2005 | McCarty et al. | | 405/224.4 |
| 2005/0130583 A1 * | 6/2005 | Troutman | | 455/3.02 |
| 2005/0163625 A1 * | 7/2005 | Cherry et al. | | 417/234 |
| 2005/0225288 A1 * | 10/2005 | Cole et al. | | 320/14 |

\* cited by examiner

PORTABLE HEATER WITH ROLL CAGE

CROSS-REFERENCE TO PRIOR APPLICATION

This application under 35 USC § 119(e) claims priority to, and benefit from, U.S. Provisional Application Ser. No. 60/822,436, filed on Aug. 15, 2006, entitled "Portable Gas Forced Air Unit," which is currently pending naming Eric Pitchford as the sole inventor, which is incorporated herein by reference.

TECHNICAL FIELD

The present invention relates to portable space heaters in particular to a portable gas forced air unit.

DETAILED DESCRIPTION

The portable gas forced air heating unit 10 depicted in the drawings provides for a self contained and protected unit capable of withstanding outside forces that would typically cause severe damage to the components of the unit. Unit 10 may be safely stored, handled, releasably interconnected, operated, and transported with minimal damage to the unit to ensure a substantially safe operating condition each time the unit is in operation.

Gas forced air heaters conventionally include an outer shell, a burner assembly mounted within the shell, and an air blower system within the outer shell behind the burner assembly. Fuel (propane, LP or natural gas) is conveyed to the burner assembly. The blower supplies combustion air to the burner assembly and forces hot combustion gases from the burner assembly while cooling the exterior of the burner assembly.

Figure 1:
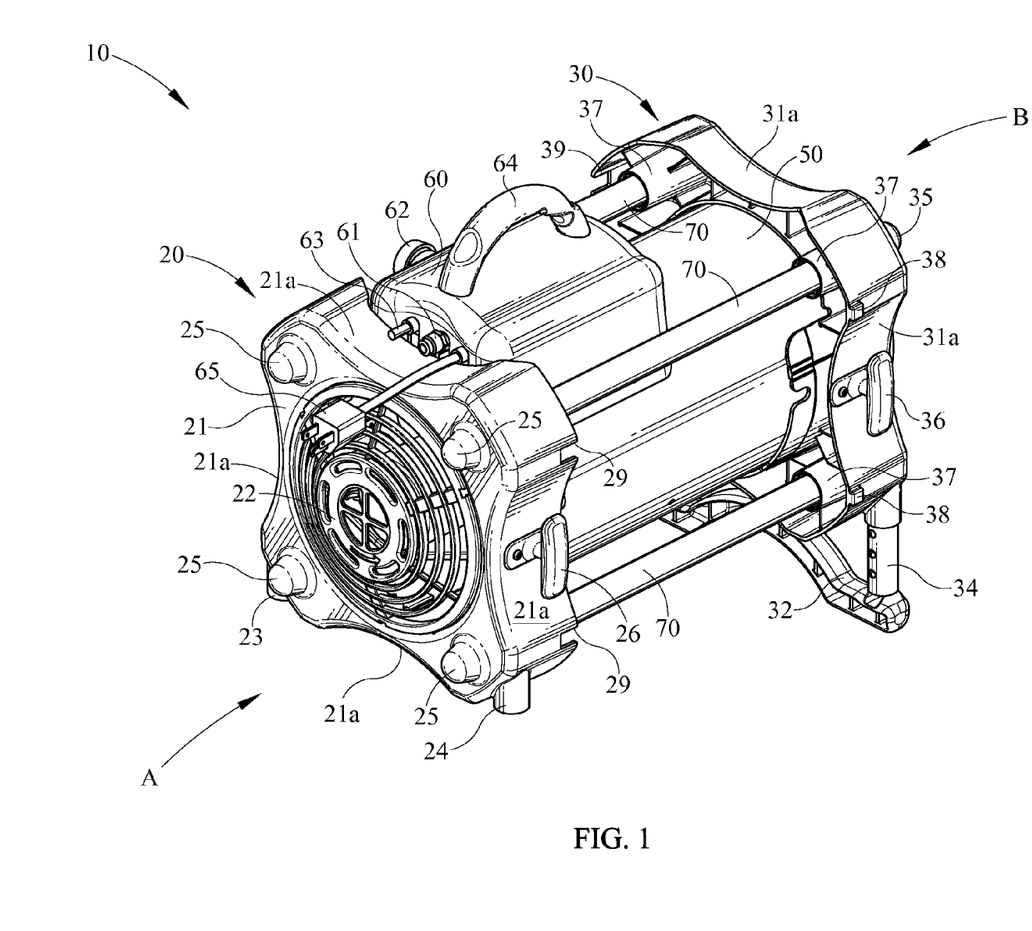
FIG. 1 is a rear perspective view of a portable gas forced air heating unit according to one embodiment.
Figure 2:
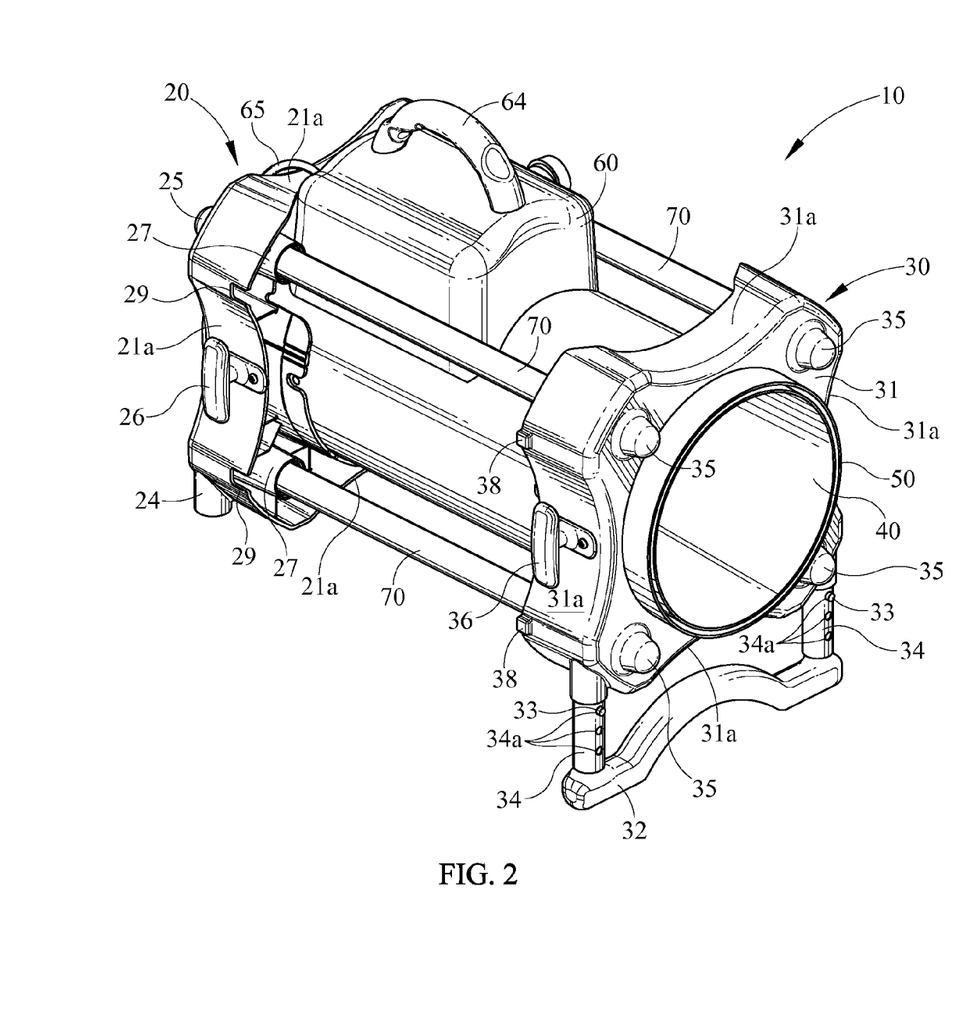
FIG. 2 is a front perspective view of the portable gas forced air heating unit of FIG. 1.
Figure 4:
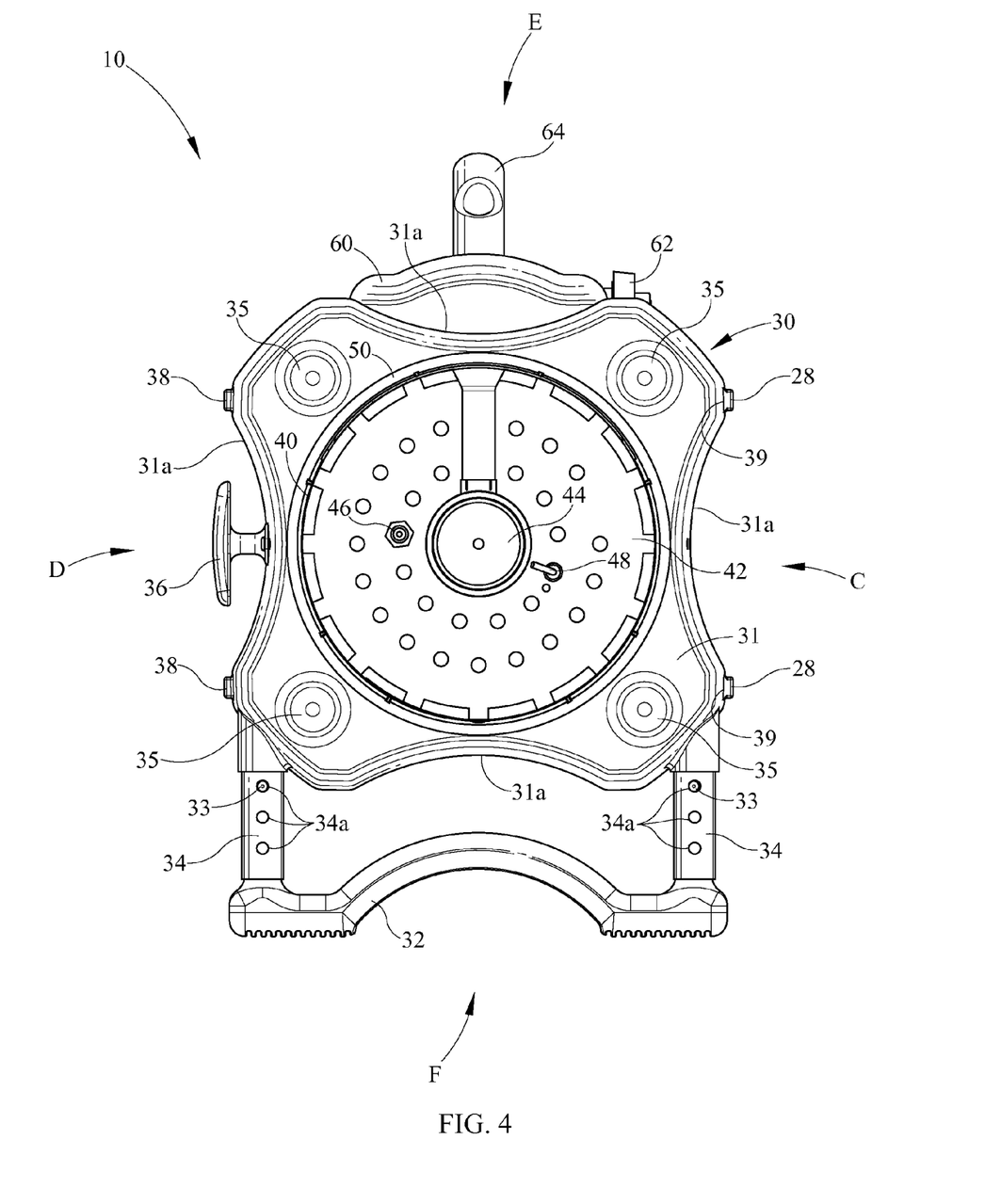
FIG. 4 is a front view of the unit of FIG. 1.

Typically in operation, but not limited there to, gas forced air heating unit 10 as shown in FIG. 1 has a gas supply (not shown) attached to an inlet connector 61 of the heater by a hose connector and regulator assembly (not shown). The gas may move through a solenoid valve (not shown), a burn rate adjustment valve 62, and out the injector (not shown) or through an automatic gas control valve (not shown), burn rate adjustment valve 62, and out the injector, of a burner assembly 44 (FIG. 4). Within the air blower system, a motor drives a fan (not shown) to draw air from the back of the unit in order to circulate or push air into and around a combustion chamber 40 (FIG. 2). Air may be circulated through a rear plate 42 (FIG. 4) when entering combustion chamber 40. The air is heated and provides a stream of clean, hot air out of an exit or outlet end B of unit 10. Air circulated between the combustion chamber 40 and a housing 50 cools the exterior of the burner assembly and the housing. A direct spark ignitor (DSI) or a high voltage ignitor (not shown) may send voltage to a spark ignitor 46 as shown in FIG. 4. Spark ignitor 46 ignites the fuel and air mixture within combustion chamber 40. Unit 10 may provide primary flame control of the burner assembly by use of either a thermocouple 48 (FIG. 4), an operated gas valve, or DSI flame rectification. The unit may have a safety control system which causes the unit to shut down if the flame goes out. Upon shutdown, the motor continues to run, but no heat is produced.

As shown in FIGS. 1, 2, and 4, unit 10 includes an elongated, substantially cylindrical shell or housing 50. Although cylindrical housing 50 may be formed from a plurality of sections of sheet metal, it is shown in the drawings as one piece of sheet metal formed to produce the shape of the housing. Housing 50 is not limited to being formed of metal. Housing 50 may be a variety of different shapes, sizes, configurations, and still be within the scope of the embodiments. As shown in FIGS. 1 and 4, unit 10 has an inlet end A, outlet end B, one lateral side C, another lateral side D, a top side E, and a bottom side F. Housing 50 surrounds burner assembly 44 whereby combustion chamber 40 is concentrically aligned with burner assembly 44 within the housing. Air is drawn from the surrounding environment through inlet end A of housing 50, heated, and then forced out of outlet end B to heat the surrounding environment. Located on top side E of unit 10, above housing 50, is the heater's control circuitry located within a control box 60. The user therefore has convenient access to control box 60 at the top of unit 10. A thermostat (not shown) may also be included in the control circuitry of unit 10 whereby the user will be able to adjust the thermostat to the desired temperature. During normal thermostatic operation, unit 10 will cycle off when the air temperature in the surrounding environment rises to the thermostat setting. When the air temperature drops sufficiently below the thermostat setting, the electric motor and fan (not shown) within unit 10 will begin to run. Subsequently, burner assembly 44 is caused to ignite and provide heat to maintain the temperature setting. A handle 64 for carrying unit 10 is attached and positioned from control box 60. Even though control box 60 and carrying handle 64 are shown in detail, the box and handle may be orientated, sized, and positioned in any manner, and more than one handle may be provided and still be within the scope of the embodiments. For instance, handle 64 may extend from a control box 60 to housing 50 or to either end caps 20, 30. Handle 64 or multiple handles may be oriented on the top, side, or on any combination of surfaces of unit 10. Handle 64 placement may depend on a specific ergonomic position related to the center of mass of the unit, because the unit may by of a variety of different sizes and lengths. Handle 64 may also be positioned solely on a roll cage bar 70 or in combination with several roll cage bars.

Control box 60 as shown in FIGS. 1, 2, 3A, and 4 may be mounted on top side E of unit 10. By being top mounted, control box 60 has the controls in an easily accessible location and capable of being serviced conveniently by the user. Control box 60 may also contain the solenoid valve, automatic control valve, DSI or high voltage ignitor, and injector. As shown in FIG. 1, control box 60 may also include the connection for a power cord 65, inlet connector 61, automatic gas control valve button 63, burn rate adjustment knob 62, as well as a thermostat control knob (not shown).

As shown in FIG. 1, in operation a user may press and hold in an automatic gas control valve button 63. Unit 10 may then be ignited within a few seconds. A unit with a thermostat control knob (not shown) may be adjusted to a desired temperature setting. If the unit does not start, the thermostatic setting may be too low and the thermostat knob would need to be turned to a higher position to ignite. With burner assembly 44 lit, unit 10 may be set to the desired heat level by turning the burn rate adjustment knob or valve 62.

As shown in FIGS. 1-6, cylindrical housing 50 and enclosed combustion chamber 40 are provided at either end with a pair of protective end caps 20, 30, interconnected by a series of roll cage bars 70. Housing 50 of unit 10 is protected from damage from outside forces by end caps 20, 30 and the interconnecting roll cage bars 70. Inlet end cap 20 is located at the proximate inlet end A of unit 10 and provided with a fan inlet cover 22 whereby intake air is circulated into the unit. Outlet end cap 30 is located at the proximate outlet end B of unit 10 adjacent the area where heated air is forced out of the unit. The outlet 30 and inlet 20 end caps may be made from, but not limited to, plastic. Each end cap 20, 30 is generally square in shape with a concave notch 21a, 31a between each of the corners of the square. Each end cap 20, 30 may be a single molded piece. Between each end cap 20, 30, a plurality of roll cage bars 70 extend longitudinally, parallel with housing 50. The roll cage bars 70 may be round as shown and may also be hollow, but alternatively they may be formed a variety of external different shapes and configurations within the scope of the embodiments herein. Roll cage bars 70 may be made from plastic or metal, but are not limited to either. As shown in FIGS. 1 and 2, unit 10 comprises, but is not limited to, four roll cage bars 70. Roll cage bars 70 are spaced in substantially a square shaped configuration, coinciding with the generally square shape of each end cap 20, 30. Each end of each roll cage bar 70 may be received by an interior facing surface or a socket 27, 37 within each respective end cap 20, 30. Roll cage bars 70 assist in distributing forces applied to either end cap 20, 30 along each bar 70 to the other respective end cap. This results in forces applied upon the end caps 20, 30 to be distributed among both the end caps and roll cage bars and minimizes unnecessary displacement of the end caps or "rocking" effect. "Rocking" of the end caps 20, 30 occurs when an outside force is applied to the end cap and the end cap entirely or partially shifts or deflects in reaction to the force. End caps 20, 30 extend radially out from outer housing 50 thereby restricting the point of contact of unit 10 with most outside forces to the outer most perimeter of the end cap and roll cage design. Thus, end caps 20, 30 and roll cage bars 70 act to minimize the potential damage to housing 50, combustion chamber 40, and other components of unit 10 by surrounding unit 10 and allowing the end caps and roll cage bars to come in contact with most objects or outside forces first. Another benefit of roll cage bars 70 is that they may function as a handle as well as a guard against outside forces. With roll cage bars 70 extending between each end cap 20, 30, one or more users can use the bars as a handle in order to transport or move the unit. Additionally when unit 10 is being carried by a user employing handle 64, roll cage bars 70 will be the first contact point between the user and the potentially heated housing 50 of the unit, when the unit is carried adjacent to the users' legs or body, thus protecting the user from potential burns. The unit may also be hung by roll cage bars 70 for storage.

Although roll cage bars 70 are shown in detail in the drawings, it is merely representative of one embodiment, and it is to be understood that there are a variety of shapes, orientations, compositions, and quantities which may be used and still be within the scope of this embodiment. For example, roll cage bars 70 may interconnect end caps 20, 30 and extend well past the inlet A and outlet B ends of unit 10. As another example, the roll cage bars 70 may also be interconnected among themselves to increase the overall protection of the unit. Any number and different configurations of roll cage bars 70 may be used to function to protect unit 10.

As shown in FIGS. 1, 3A, 5, and 6, inlet end cap 20 includes a fan inlet cover or guard 22. Fan inlet cover 22 may be fastened to and extend out from an outside surface 21 of inlet end cap 20 or may attach to the interior of housing 50. Fan inlet cover 22 is disposed over inlet end A of unit 10 in order to prevent large particles and minimize the possibility of other objects entering and damaging the interior of the unit. Fan inlet cover 22 may be made from, but is not limited to, metal or plastic. Fan inlet cover 22 may have any one of a number of shapes and designs known in the art and still be within the scope of the embodiments herein. A pair of protruding feet 23, 24 extend from the bottom edges of inlet end cap 20. Protruding feet 23, 24 on either corner of inlet end cap 20 will serve to maintain the balance and orientation of unit 10 during operation if and when the unit might be shifted off of its resting position. Inlet end cap 20, as shown in FIG. 1, may extend to or even beyond the end of inlet end A of housing 50, because the temperature of housing 50 is minimal at inlet end A of the gas forced air unit.

Outlet end cap 30 as shown in FIG. 2 will typically not extend to the end of outlet end B of housing 50, due to the increased temperature at outlet end B resulting from the combustion occurring within. Accordingly outlet end cap 30 will typically be offset from the outlet end of housing 50 in the direction of inlet end cap 20. This minimizes the likelihood that outlet end cap 30 will be damaged by high temperature. Alternatively, outlet end cap 30 may extend to or even beyond the end of outlet end B of housing 50 in order to protect the housing. As will be recognized by those skilled in the art, outlet end cap 30 may be constructed of a high temperature resistant material which would minimize or eliminate the need for such offset.

Although end caps 20, 30 are shown in detail in the drawings, they merely represent one embodiment, and it is to be understood that there are a variety of shapes, positions, compositions, and constructions which may be used and still be within the scope of these embodiments.

As shown in FIGS. 2, 4, 5, and 6, an adjustable foot mechanism 32 extends down from outlet end cap 30. Foot mechanism 32 is adjustable to direct heat from unit 10 at selective heating angles relative to the ground as shown for example in FIG. 5. Foot mechanism 32 may be made from, but is not limited to, plastic. Integral tabs 33 in the foot mechanism 32 releasably link the mechanism to a pair of tubes 34 which are secured to outlet end cap 30. Tubes 34 may be made from, but are not limited to, metal. Foot mechanism 32 and tabs 33 permit the adjustment of the angle at which unit 10 is supported for heating. Each of tubes 34 is provided with a series of vertically aligned holes 34a to allow tabs 33, which may be manually depressed, to engage and disengage holes 34a, to allow angular adjustment of the foot mechanism 32. When engaged in holes 34a, tabs 33 act to lock the foot mechanism in the desired angle. The pre-selected positions of holes 34a provide a safety feature as the angle of foot mechanism 32 is limited within a safe range relative to the ground for the use of unit 10.

As shown in the drawings, the pair of end caps 20, 30 may each support cord cleats 26, 36 extending therefrom which may be used to wind up a power cord 65 or an electrical extension cord for storage. The cord cleats 26, 36 may conveniently extend from notches 21a and 31a in end caps 20 and 30. Cord cleats 26, 36 are preferably essentially and chords may be conveniently wrapped there around and secured against unwinding. Notches 21a, 31a allow the wrapped cord to be substantially and neatly contained within the outer perimeter of end caps 20, 30 as can be seen from FIG. 4. Such a wound cord decreases the likelihood that the cord will catch on objects during transport, storage, or use.

Figures 3A, 3B, 3C:
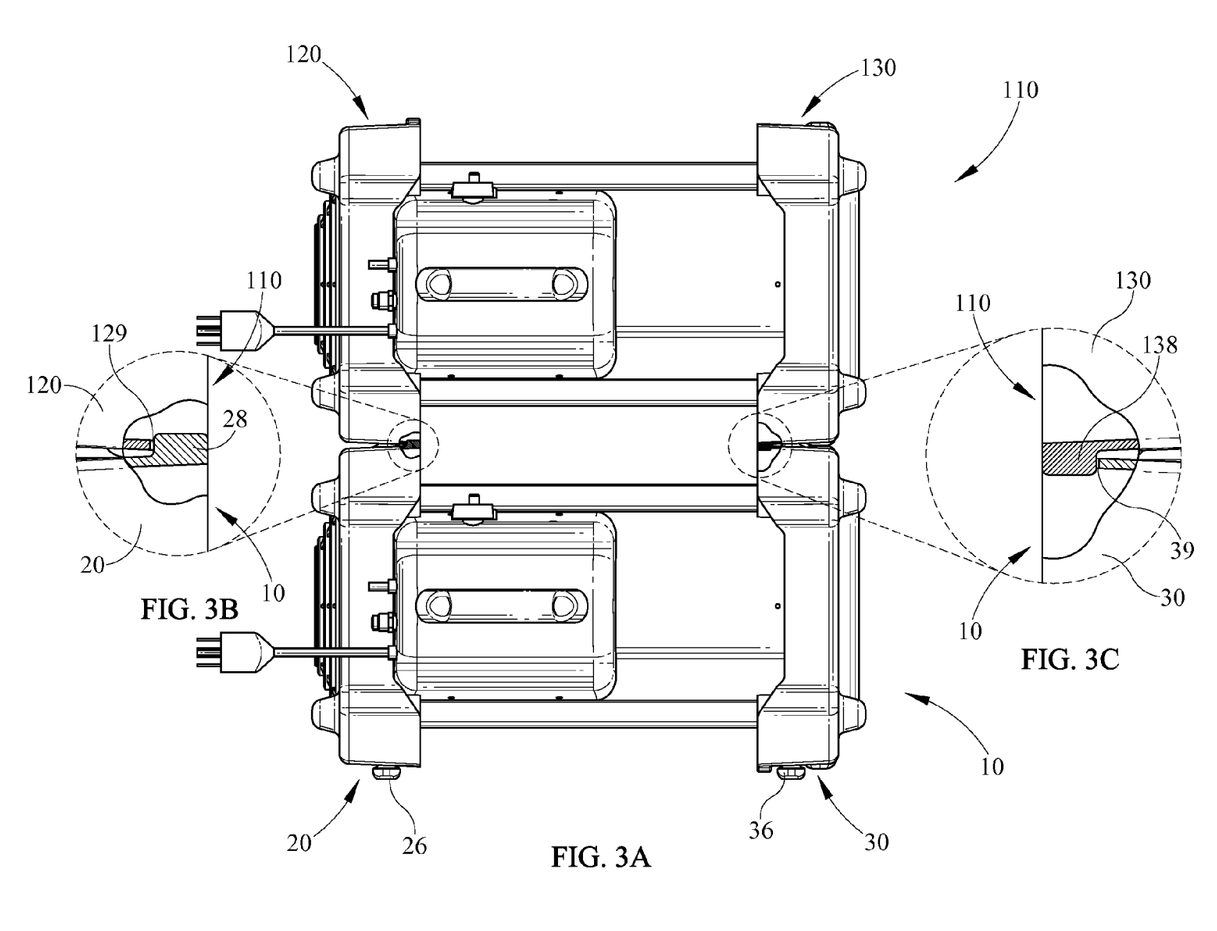
FIG. 3A is a top view of two similar heating units releasably interconnected together in a horizontal position.
FIG. 3B is an enlarged, partial sectional view with portions of the inlet end caps partially broken away to reveal the interconnection of two similar units of FIG. 3A.
FIG. 3C is an enlarged, partial sectional view with portions of the outlet end caps partially broken away to reveal the interconnection of two similar units of FIG. 3A.
Figure 5:
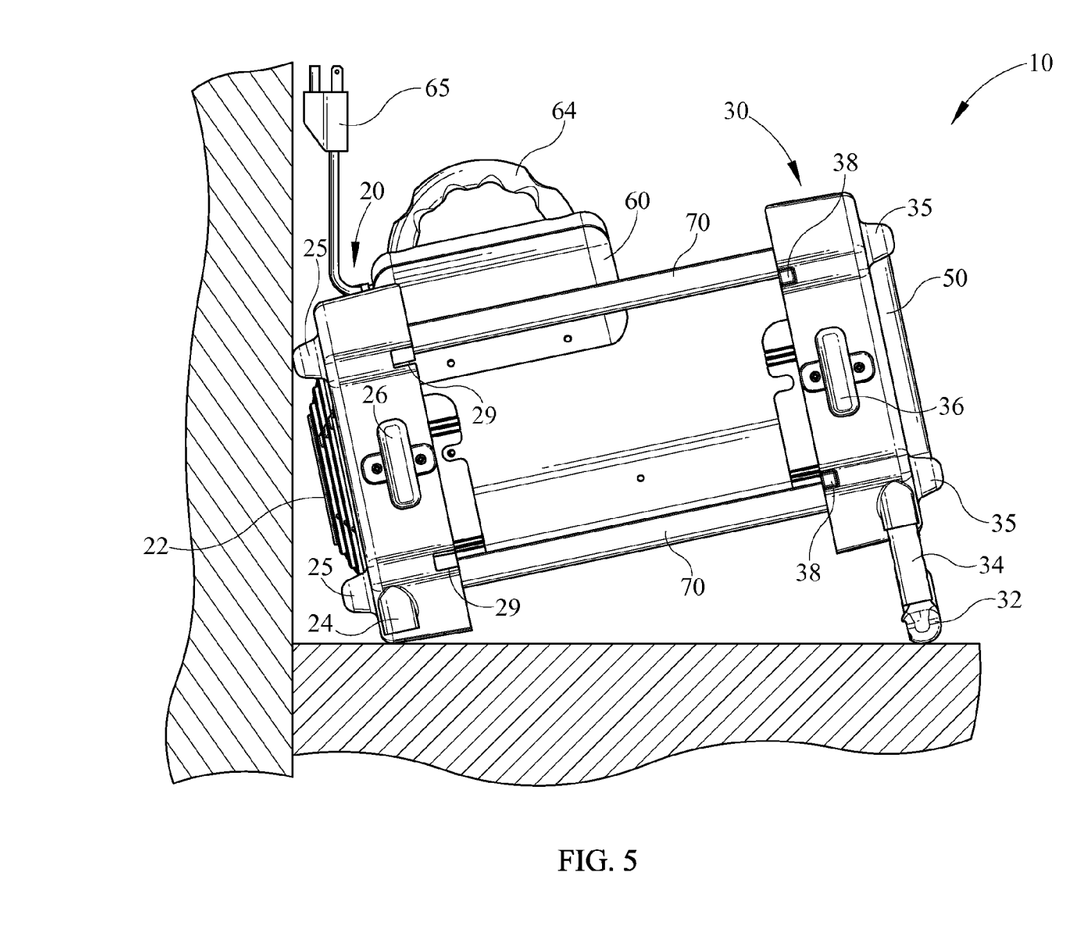
FIG. 5 is a side view of the unit of FIG. 1 in a horizontal, operating position abutted against a vertical structure.
Figure 6:
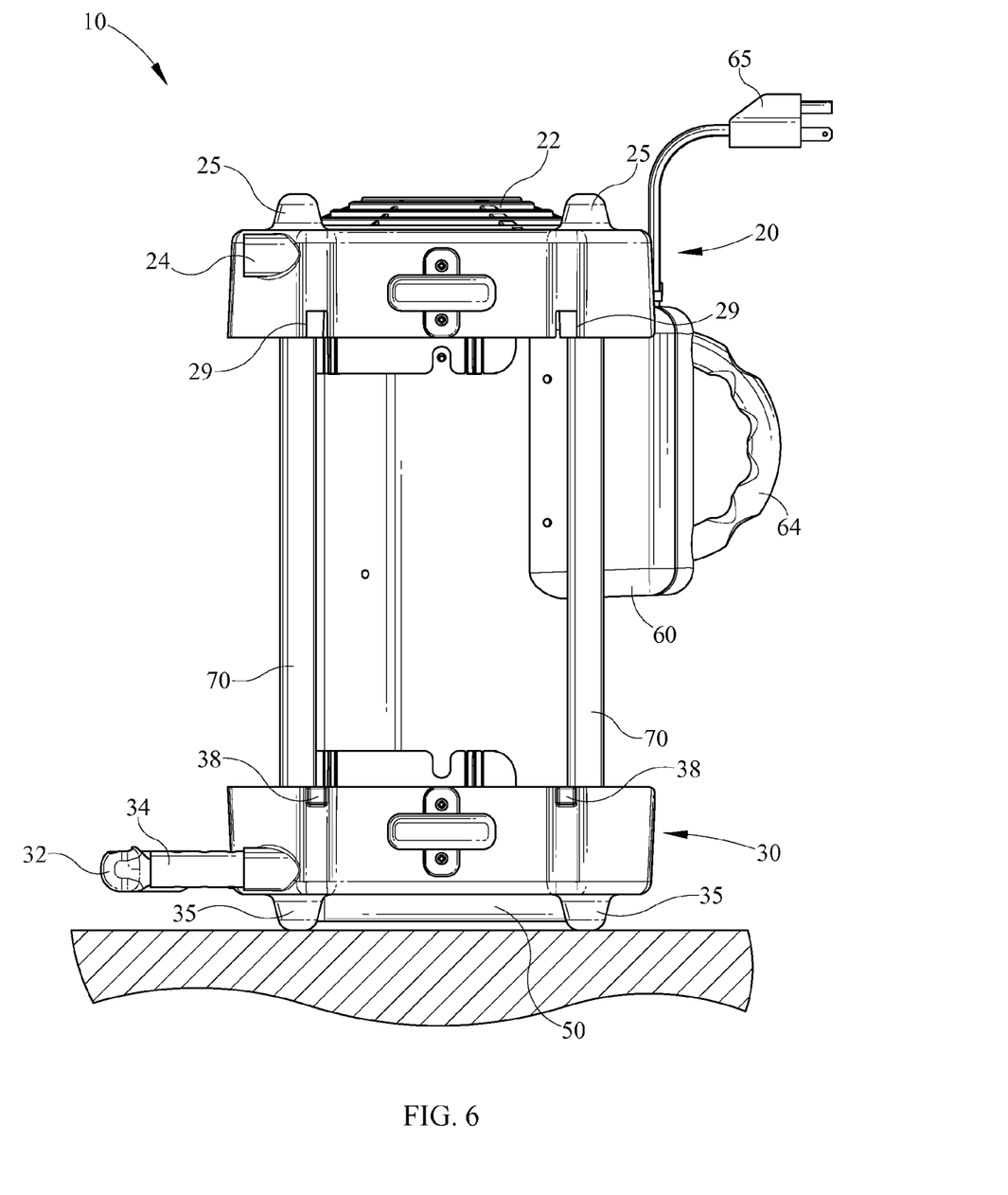
FIG. 6 is a side view of the unit of FIG. 1 in a vertical position on end.

The pair of end caps 20, 30 as shown in FIG. 3A may also provide a means for releasably interconnecting unit 10 with similar units. The interconnecting of two or more units 10 may be used to create an integral heater unit to increase the heat output to the surrounding environment. Releasably interconnected limits at least axial movement of the combined units. As will be recognized by those skilled in the art, units may be interlocked together limiting substantial movement relative to each other. Releasably interconnecting also permits the units to be interconnected and conveniently stored. As shown in FIGS. 1 and 4, outlet end cap 30 on one side D of unit 10 is provided with a pair of tabs 38, one each at the proximate upper and lower corners of the end cap. Inlet end cap 20 on side D of unit 10 has a pair of slots 29, one each at the proximate upper and lower corners of the end cap. As shown in FIG. 4, inlet end cap 20 on the other side C of unit 10 has a pair of tabs 28, one each at the proximate upper and lower corners of the end cap, and outlet end cap 30 on side C of unit 10 has a pair of slots 39, one each at the proximate upper and lower corners of the end cap. Thus one side of one unit may releasably interconnect with the opposite side of a second unit as shown in FIG. 3A, with tabs on one unit, sliding and being secured within adjacent slots of the other unit, thereby releasably interconnecting the heating units to substantially prevent relative axial movement. More specifically as shown in FIG. 3B, tab 28 of inlet end cap 20 of unit 10 will combine together and mate with slot 129 of inlet end cap 120 of unit 110. As shown in FIG. 3C, slot 39 of outlet end cap 30 of unit 10 will come together and mate with tab 138 of outlet end cap 130 of unit 110. The corresponding tabs and slots of each side of similar units thus come together and mate the two separate units into one combined unit aligning the outlet ends together in a single direction. It will also be seen that additional units beyond two may be added to either side of the two units described above. Multiple units may thus be releasably interconnected for example, for operating purposes, in the substantially horizontal position (FIG. 5) or may be similarly interconnected in the vertical position (FIG. 6). Again, interconnecting multiple, congruent units increases the number of units operating together to heat the desired surroundings.

Although tabs 28, 38 and slots 29, 39 are shown in detail herein, a variety of different complementary connection configurations may be used to combine two or more similar units. Also, end caps may be configured for dual use either as an inlet end cap 20 or an outlet end cap 30. An end cap would be located at one end of the unit while a similar end cap would only need to be reversed 180 degrees and positioned at the opposite end of the unit. Thus, a single end cap would be molded and may then be used at either end of the unit reducing manufacturing costs per unit. Each end cap 20, 30, regardless of configuration on the unit may be designed to have the capability for provision of roll cage bars, a foot mechanism, tubes, slots and tabs, and cord cleats (on either side of the unit).

As shown in FIGS. 1 and 2, end caps 20, 30 may also include a protrusion or protective end bumps 25, 35 on outward facing surfaces 21, 31. Protrusions or end bumps 25, 35 may be formed or molded integrally with end caps 20, 30, or subsequently attached thereto. End bumps 20, 30 may be made from, but are not limited to, plastic. The outwardly extending end bumps 25, 35 protect the extremities of unit 10 including, the outer end of the cylindrical combustion chamber 40 and housing 50, and the fan guard 22. The outward extending end bumps 25, 35 protects unit 10 both when it is placed on end in a vertical position (FIG. 6) and when the unit is in a substantially horizontal position (FIG. 5). For example when vertically oriented as shown in FIG. 6, the entire weight of unit 10 would rest and balance on end bumps 35. In use unit 10 may be vertically supported on either end of the unit and be protected by the end bumps 25, 35. As shown in the embodiment of FIGS. 1, 2, and 4, each end cap is provided with four end bumps, each located at the proximate corner of the outwardly facing surfaces 21, 31 of end caps 20, 30. End bumps 25, 35 are generally coaxially aligned with roll cage bars 70. By being coaxially aligned, outside forces that are applied to end bumps 25, 35 while unit 10 is in a vertical (FIG. 6) or horizontal (FIG. 5) position will transfer from at least one proximate end bump through at least one bar 70 to the other respective at least one distal end bump minimizing any "rocking" effect or displacement of the end caps that may occur. End bumps 35 located on outlet end cap 30 of outlet end B of unit 10 are dimensioned to extend from outward facing surface 31 of the end cap and out past the outer end of housing 50 and combustion chamber 40. This in effect extends end cap 30 past the outer end of housing 50 in order to prevent damage thereto from contact with other surfaces, such as walls, floors and the like. Additionally, having end bumps 25, 35 circumscribing and extending out past the ends of the cylindrical housing 50 serves to balance the unit if placed on end. End bumps 25 located on inlet end cap 20 of unit 10 may be dimensioned to extend out past the end surface of fan guard 22 to protect the fan guard and that end of housing 50. Also, a plurality of units may be releasably interconnected side by side vertically on end (FIG. 6) or similarly interconnected side by side in a substantially horizontally position (FIG. 5) and the protective bumps 25, 35 of end caps 20, 30 will provide protection for the unit.

As will be seen by one skilled in the art, protrusions of the end caps 20, 30 or protective end bumps 25, 35 may be provided in a number of different sizes, quantities, shapes, and compositions, and may be placed in various positions on the end caps and still function to protect the ends A, B of unit 10 while in substantially horizontal or vertical position. As will be recognized by those skilled in the art, a single protrusion, series of protrusions, or a protrusion comprising of multiple end bumps 25, 35 may form many shapes that surround the housing 50 and protect the unit. Protrusions may take shapes, but not limited to, such as a continuous ring or discontinuous ring. These protrusions still function to protect the housing 50 in either horizontal or vertical positions of the unit.

It is understood that while certain embodiments of the invention have been illustrated and described, it is not limited thereto except insofar as such limitations are included in the following claims and allowable functional equivalents thereof.

We claim:
1. A heating system comprising:
an elongated cylindrical airflow housing having an inlet end and an outlet end, said inlet end defining an air inlet opening and said outlet end defining an air outlet opening, wherein said air inlet opening and said air outlet opening is axially aligned through said airflow housing;
a combustion chamber having a burner assembly, and a fan forcing air through said air inlet opening and axially through said airflow housing while being heated by said combustion chamber, whereby said heated air exits through said air outlet opening;

a first end cap adjacent said inlet end and a second end cap adjacent said outlet end; and a plurality of roll cage bars extending between said first end cap and said second end cap so that said roll cage bars extend substantially parallel to an exterior surface of said housing.

2. The heating system as in claim 1 wherein said first end cap includes a fan guard.

3. The heating system as in claim 1 wherein said first end cap and second end cap radially extend out from said exterior surface of said housing.

4. The heating system as in claim 1 wherein each said first end cap and said second end cap are substantially square in shape.

5. The heating system as in claim 4 wherein each said roll cage bar extends between a corner of each said first end cap and said second end cap.

6. The heating system as in claim 5 wherein each said first end cap and said second end cap have at least one notch between adjacent said corners for receiving a cord cleat.

7. The heating system as in claim 1 wherein said second end cap has a depending foot mechanism to adjust an output angle of said housing.

8. The heating system as in claim 1 wherein said second end cap offset from said outlet end in a direction towards said inlet end.

9. A portable heating system with a roll cage comprising:

an elongated cylindrical airflow housing having an inlet end and an outlet end, said housing having an air outlet opening defined by said outlet end axially aligned with an air inlet opening defined by said inlet end, whereby a fan circulates the airflow into said air inlet opening and out of said air outlet opening when a combustion chamber with a burner assembly heats the airflow passing through said housing;

a first end cap located adjacent said inlet end;

a second end cap located adjacent said outlet end; and a plurality of bars external to said housing and interconnecting said first end cap to said second end cap to form said roll cage, each of said plurality of bars positioned about 90 degrees from each adjacent said bar about the vertical axis of said elongated cylindrical airflow housing.

10. The portable heating system as in claim 9 wherein said plurality of bars extending substantially parallel to an exterior surface of said elongated housing.

11. The portable heating system as in claim 9 wherein said plurality of bars extend axially outside an exterior surface of said elongated housing.

12. The portable heating system as in claim 9 wherein said first end cap and said second end cap radially extend out from an exterior surface of said elongated housing.

13. The portable heating system as in claim 9 wherein said second end cap offset from said outlet end in a direction towards said inlet end.

14. The portable heating system as in claim 9 wherein said first end cap includes a fan guard.

15. The portable heating system as in claim 9 wherein each said bar extends from an inside surface of said first end cap to an inside surface of said second end cap.

16. The portable heating system as in claim 9 wherein said second end cap has a depending foot mechanism to adjust an output angle of said elongated housing.

17. A cylindrical gas forced air unit comprising:

a cylindrical airflow housing having an inlet end and an outlet end on opposing axially ends of said cylindrical housing;

a first end cap located adjacent said inlet end;

a second end cap located adjacent said outlet end;

each of said first end cap and said second end cap radially extend out from an exterior surface of said housing, wherein each of said first end cap and said second end cap is in a noninterference airflow relationship with each of said inlet end and said outlet end;

a combustion chamber, a fan, a primary flame control, and an ignitor positioned within said cylindrical housing;

a plurality of members interconnecting an interior surface of said first end cap to an interior surface of said second end cap; and each of said plurality of members extending axially and substantially parallel to an exterior surface of said cylindrical airflow housing.

18. The cylindrical gas forced air unit as in claim 17 wherein each said member is a bar.

19. The cylindrical gas forced air unit as in claim 17 wherein said plurality of members is arranged in a substantially square configuration where they contact to said first end cap and said second end cap.

20. The cylindrical gas forced air unit as in claim 17 wherein said second end cap offset from said outlet end of said housing in a direction towards said inlet end of said housing.

21. The cylindrical gas forced air unit as in claim 17 wherein said first end cap includes a fan guard.

22. The cylindrical gas forced air unit as in claim 17 wherein said second end cap has a depending foot mechanism to adjust an output angle of said housing.

* * * * *

UNITED STATES PATENT AND TRADEMARK OFFICE
CERTIFICATE OF CORRECTION

| | | |
|---|---|---|
| PATENT NO. | : 7,600,998 B1 | Page 1 of 1 |
| APPLICATION NO. | : 11/668668 | |
| DATED | : October 13, 2009 | |
| INVENTOR(S) | : Eric Pitchford | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 144 days.

Signed and Sealed this
Twenty-fifth Day of January, 2011

David J. Kappos
*Director of the United States Patent and Trademark Office*